United States Patent [19]

Gorter et al.

[11] Patent Number: 4,670,807
[45] Date of Patent: Jun. 2, 1987

[54] MAGNETIC WRITE HEAD WITH SMOOTH FREQUENCY RESPONSE

[75] Inventors: Frederik W. Gorter; Jean-Paul G. R. Morel; Jacobus J. M. Ruigrok, all of Eindhoven, Netherlands

[73] Assignee: U.S. Philips Corporation, New York, N.Y.

[21] Appl. No.: 690,338

[22] Filed: Jan. 10, 1985

[30] Foreign Application Priority Data

Jan. 17, 1984 [NL] Netherlands .................. 8400140

[51] Int. Cl.[4] .................. G11B 5/235; G11B 5/127
[52] U.S. Cl. .................................. 360/120; 360/125
[58] Field of Search .............. 360/120, 121, 119, 122, 360/125, 127

[56] References Cited

U.S. PATENT DOCUMENTS 3,143,603  8/1964  Widener ........................ 360/120
4,180,835 12/1979  Okumura et al. ............. 360/120

FOREIGN PATENT DOCUMENTS 57-103116  6/1982  Japan ............................ 360/121
58-159219  9/1983  Japan ............................ 360/121
   92346  10/1959  Netherlands ................. 360/121
 8303918  11/1983  World Int. Prop. O. ..... 360/120
  652605   3/1979  U.S.S.R. ....................... 360/120

Primary Examiner—John H. Wolff
Assistant Examiner—Matthew J. Bussan
Attorney, Agent, or Firm—F. Brice Faller

[57] ABSTRACT

A core of a soft-magnetic material with a comparatively low saturation magnetization has layers of a soft-magnetic material with a higher saturation magnetization on the gap-bounding faces. To compensate for the uneven frequency response cause by the non-magnetic transition zones between the material of the core and the layers of soft-magnetic material, the layers of soft-magnetic material on the gap-bounding faces have different thicknesses.

7 Claims, 11 Drawing Figures

MAGNETIC WRITE HEAD WITH SMOOTH FREQUENCY RESPONSE

BACKGROUND OF THE INVENTION

The invention relates to a magnetic head having a core of a soft-magnetic material with a comparatively low saturation magnetization, a gap between gap-bounding faces in the core, each of said gap-bounding faces being coated with a layer of soft-magnetic material having a higher saturation magnetization than the material of the core, transition zones which are poor magnetic conductors being present between the core and the layers of soft-magnetic material.

Such a magnetic head is known from Japanese published Patent application No. 55-58824 (A). The soft-magnetic material of the core of said magnetic head is ferrite. The use of ferrites, in particular mono-crystalline-Mn-Zn-ferrites, as a magnetic core material for magnetic heads is much preferred in particular in systems for magnetic recording and playback, for example audio and video tape recorders, but also in memories having magnetic discs. Ferrites have a high resistance to detrition, a comparatively high specific electrical resistivity and good magnetic properties, for example, a low coercive force, a large permeability and a good frequency characteristic.

The magnetic field which is generated at the area of the gap by a magnetic head so as to write information on a magnetic medium is restricted by the saturation magnetization of the material of the core of the magnetic head. Magnetic heads for the present-day video recorders generally have a core of Mn-Zn-ferrite. This type of material has a saturation magnetization of approximately 0.5 Tesla at room temperature. Said magnetization satisfies, up to temperatures slightly above room temperature, the requirements imposed by writing of information on conventional tapes, for example $CrO_2$ tapes having a coervice force $H_c$ of approximately 56 kA/m.

However, in order to improve the quality of the video recording process there is a tendency to replace the conventional magnetic tapes by magnetic tapes having a higher coervice force, for example, tapes based on pure Fe which have an $H_c$ of approxiamtely 80–160 kA/m.

A magnetic head having a core of a soft-magnetic material with a comparatively low saturation magnetization cannot write such tapes very well, In fact, for writing tapes with a large coercive force the magnetic field of the magnetic head should also be large, which causes problems in that the magnetic field cannot be larger than the saturation magnetization of the material of the core. Saturation effects occur first at the edges of the gap.

In the magnetic head disclosed in the Japanese Patent application No. 55-58824 (A) saturation effects are controlled by providing on each of the gap bounding faces a layer of a material having a higher saturation magnetization than the material of the core. Since these saturation effects occure first at the edges of the gap with increasing magnetization of the core, this known magnetic head can be magnetized more strongly.

However, it is also stated in Japanese Patent application No. 55-58824 (A) that an artificial gap is formed between the core and the layer of material having a higher saturation magnetization than the material of the core. This artificial gap is formed as a result of the magnetically poorly conducting transition zone between the ferrite and the layer provided. As a result the magnetic head as it were has a main gap and two subsidiary gaps. It will be obvious that such a gap configuration adversely influences playback with a magnetic head. In particular the frequency characteristic of the magnetic head is adversely influenced. In this Japanese Patent application an attempt is made to mitigate this disadvantage slightly by giving the magnetically poorly conductive transition zone an irregular contour. Such a measure, which is technically difficult to perform since the main gap should be straight and the layers provided should be comparatively thin to avoid eddy currents and adhesion problems, provides insufficient effect.

SUMMARY OF THE INVENTION

It is an object of the invention to provide a magnetic head in which the detrimental influence of the subsidiary gaps is considerably reduced. Another object of the invention is to provide a magnetic head which can be used up to very high frequencies. A further object of the invention is to provide a magnetic head with which magnetic recording material having a high coercive force can be written.

According to the invention, a magnetic head of the kind described in the opening paragraph is characterized in that layers of soft-magnetic material of different thicknesses are provided on the gap-bounding faces.

The invention is based on the recognition of the fact that in a magnetic head according to the invention the phase between the signals of the main gap and the subsidiary gap(s) can be adjusted. This degree of freedom makes it possible to compensate for the detrimental influence on the frequency characteristic in a selected frequency range as a result of which inter alia the original purpose of the layers of material having a higher saturation magnetization than the material of the core, namely avoiding saturation effects, is still realized.

In a magnetic head according to the invention the transition zones may in particular be intermediate layers which serve for bonding the layer of soft-magnetic material to the material of the core. It has been found that such an intermediate layer is often necessary because the bonding of suitable soft-magnetic materials to, for example, an oxydic material, such as ferrite, is often bad.

In a particular embodiment of a magnetic head according to the invention the radio of the thicknesses of the layers of soft-magnetic material on the two gap-bounding faces is between 1.15 and 2.

The invention will be described in greater detail with reference to the accompanying drawings.

DESCRIPTION OF THE PREFERRED EMBODIMENT

Figure 1:
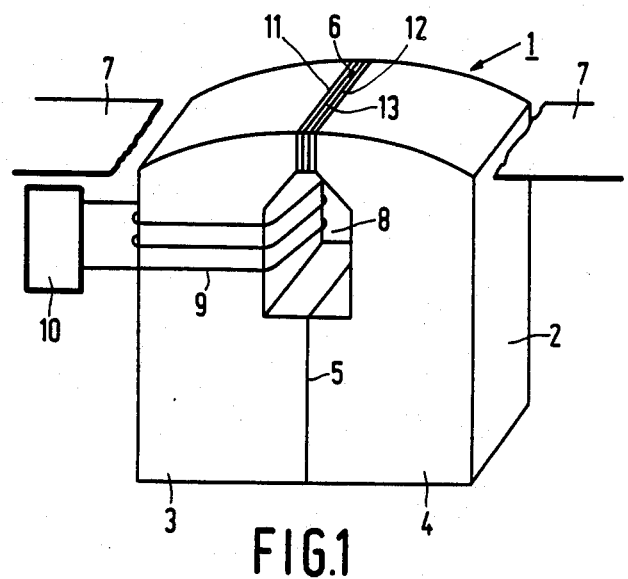
FIG. 1 is a perspective view of a magnetic head according to the invention.

FIG. 1 shows a magnetic head 1 having a core 2 which is formed by two core parts 3 and 4. The core parts 3 and 4 consist of a material having a comparatively low saturation magnetization, in this case ferrite, and in particular monocrystalline Mn-Zn-ferrite, and they are bonded together in the regions 5 and 6 by means of an adhesive material, (for example glass). The recording medium is shown as a magnetic tape 7 which is transported past the gap 13. The thickness of the layer of bonding material in the region 6 determines the thickness of the gap 13 in the recording direction. The magnetic core 2 furthermore comprises a winding apperture 8. Writing and reading with the magnetic head 1 is done in known manner by means of coil 6 and device 10.

In the region 6 the core parts 3 and 4 comprise layers 11 and 12 of a soft-magnetic material having a higher saturation magnetization than the material of the core. The gap 13 is located between the layers 11 and 12. The layers 11 and 12 serve in known manner to prevent saturation effects in the magnetic head 2 which first occur in the gap 13, or to allow them to occur only at higher field strengths. The layers 11 and 12 consist, for example, of sputtered layers of an Fe-Al-Si-alloy, termped "Sendust" having 83.2%, Fe, 6.2% Al and 10.6% Si (percent by weight) or of amorpheous metal alloys such as $Co_{70}Fe_5B_{10}Si_{15}$ or $Co_{71}Mn_7B_{14}Si_8$ (indices indicate atomic percent).

Figure 2:
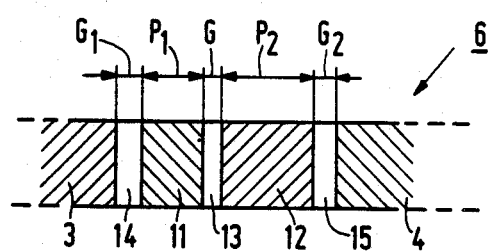
FIG. 2 shows diagrammatically the gap widths and layer thicknesses in the gap region.

FIG. 2 shows diagrammatically the configuration of the gap 13, the layers 11 and 12 and the core parts 3 and 4 in the region 6. Transition zones 14 and 15 which are non-magnetic are present between the layers 11 and 12 and the core parts 3 and 4, respectively. They form as it were articficial gaps which, as already stated, adversely influence the frequency characteristic of the magnetic head 2. The transition zones 14 and 15 may also be formed by intermediate layers of, for example, glass or titanium which serve for better bonding of the layers 11 and 12 to the core parts 3 and 4. The thicknesses of the various layers and gaps are shown in FIG. 1 by $G_1$, $P_1$, G, $P_2$ and $G_2$. In known magnetic heads the layers 11 and 12 have the same thickness and hence $p_1 = P_2$. In a magnetic head according to the invention $P_1$ is not equal to $P_2$.

FIGS. 3—11 serve to illustrate the influence of the variation of $P_2$ with respect to $P_1$. For all the FIGS. 3—11 G=0.3 μm, $G_1$=0.04 μm, $G_2$=0.04 μm, and $P_1$=1 μm. The head-tape speed is 3.14 m/s. The tape has a high coercive force $H_c$=115 kA/m. The frequency is plotted linearly along the horizontal axis from 0 to 8 MHz. Along the vertical axis the induction voltage of the magnetic head 2 is plotted in dB. Approaching zero MHz the induction voltage of course becomes zero. The graph shows the frequency characteristic of the magnetic head 1 with an optimally written tape as input.

Figure 3:
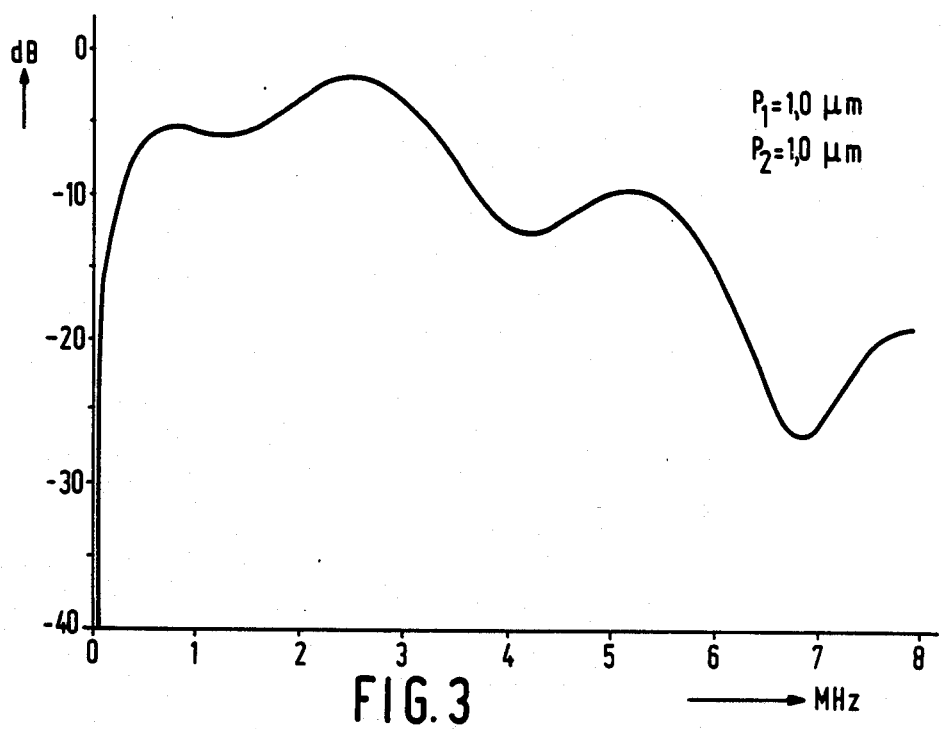
FIGS. 3—11 show a number of frequency characteristics of magnetic heads having different gap configurations.

In FIG. 3, $P_2 = P_1 = 1.0$ μm. The frequency characteristic clearly shows a very irregular variation which is very difficult to compensate by means of filters.

Figure 4:
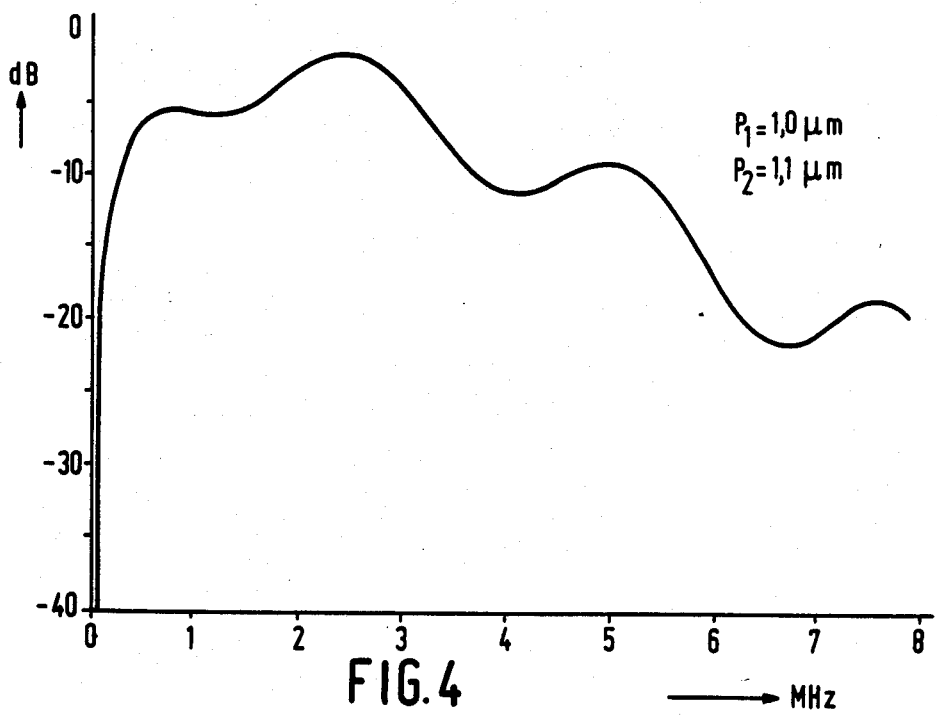

In FIG. 4, $P_2 = 1.1$ and $P_1 = 1.0$ μm. With this value of $P_2$ also the frequency characteristic is still very irregular.

Figure 5:
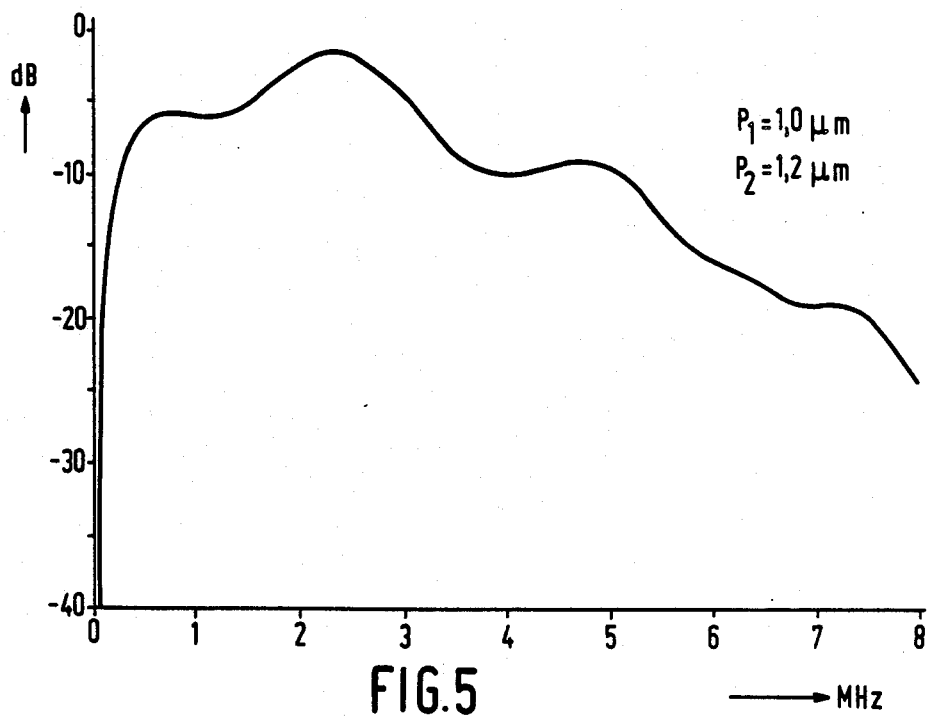

In FIG. 5, at $P_2 = 1.2$ and $P_1 = 1.0$ μm, the frequency characteristic is already becoming reasonably smooth.

Figure 6:
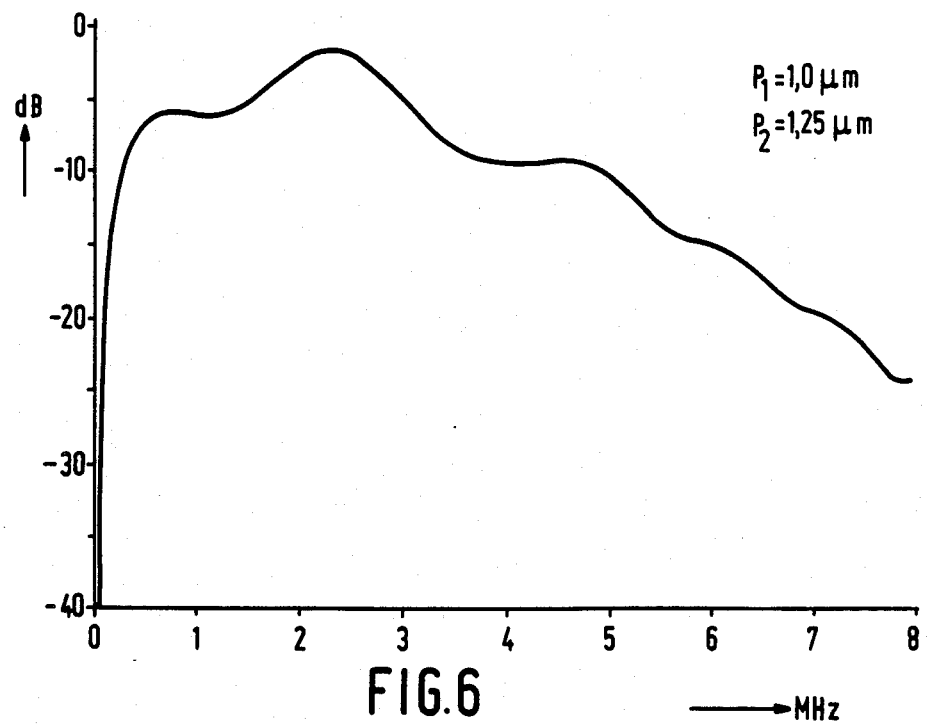

In FIG. 6, $P_2 = 1.25$ μm and $P_1 = 1.0$ μm. In this case the frequency characteristic has been equalized optimally over the whole range shown.

Figure 7:
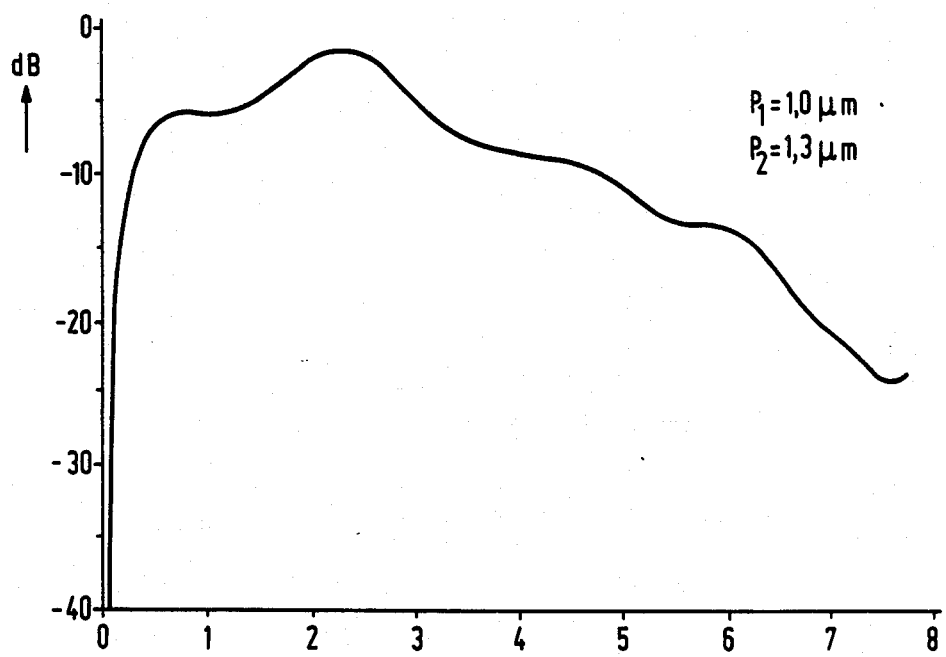

In FIG. 7, at $P_2 = 1.3$ and $P_1 = 1.0$ μm the frequency characteristic is very acceptable.

Figure 8:
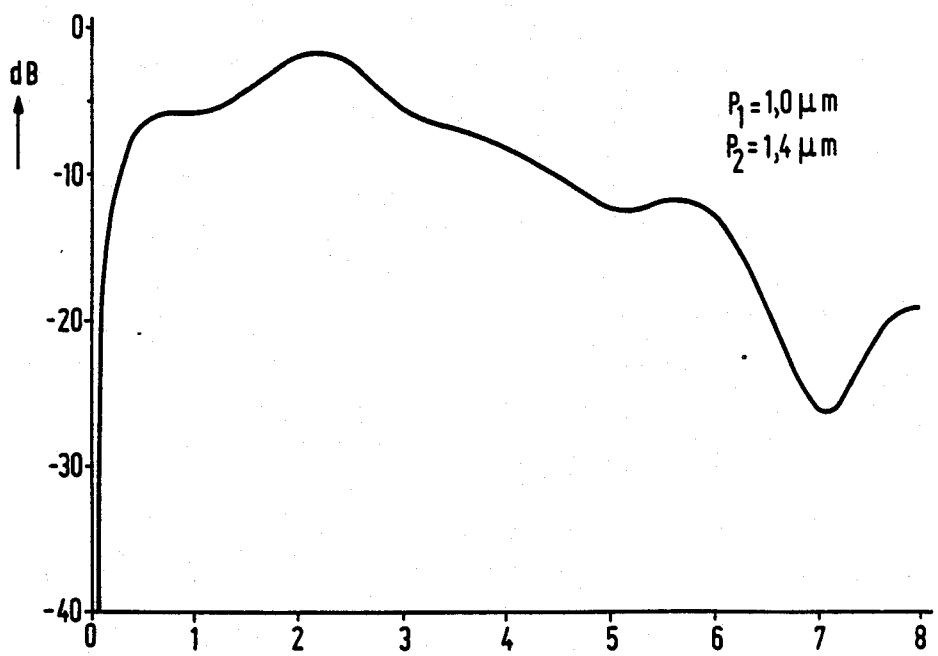

In FIG. 8 at $P_2 = 1.4$ and $P_1 = 1.0$ μm a dip in the freqency characteristic again occurs at approximately 7 MHz.

Figure 9:
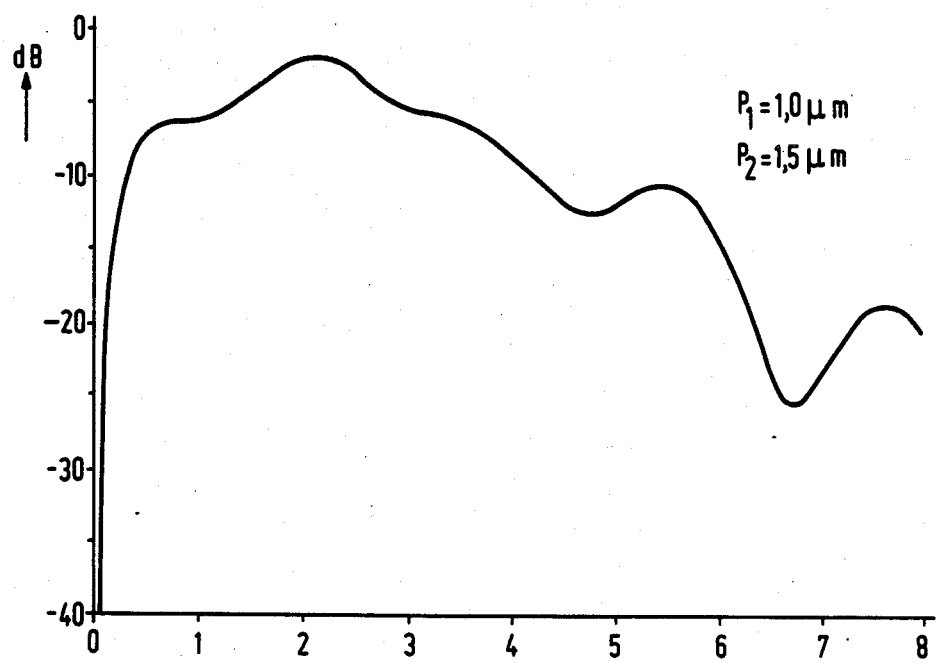

In FIG. 9, at $P_2 = 1.5$ and $P_1 = 1.0$ μm the frequency characteristic begins to vary slightly more irregularly.

Figure 10:
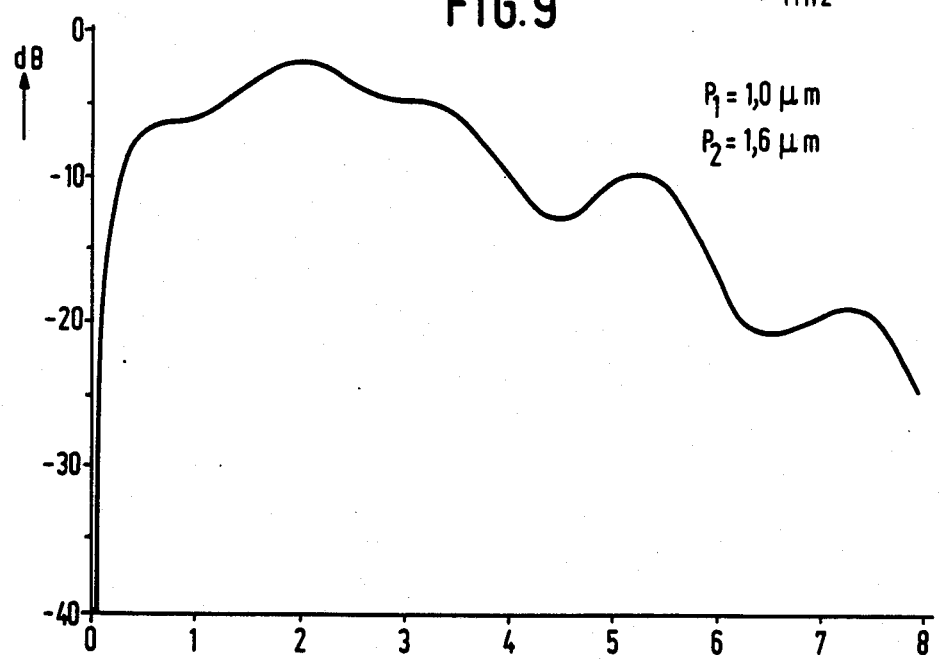
Figure 11:
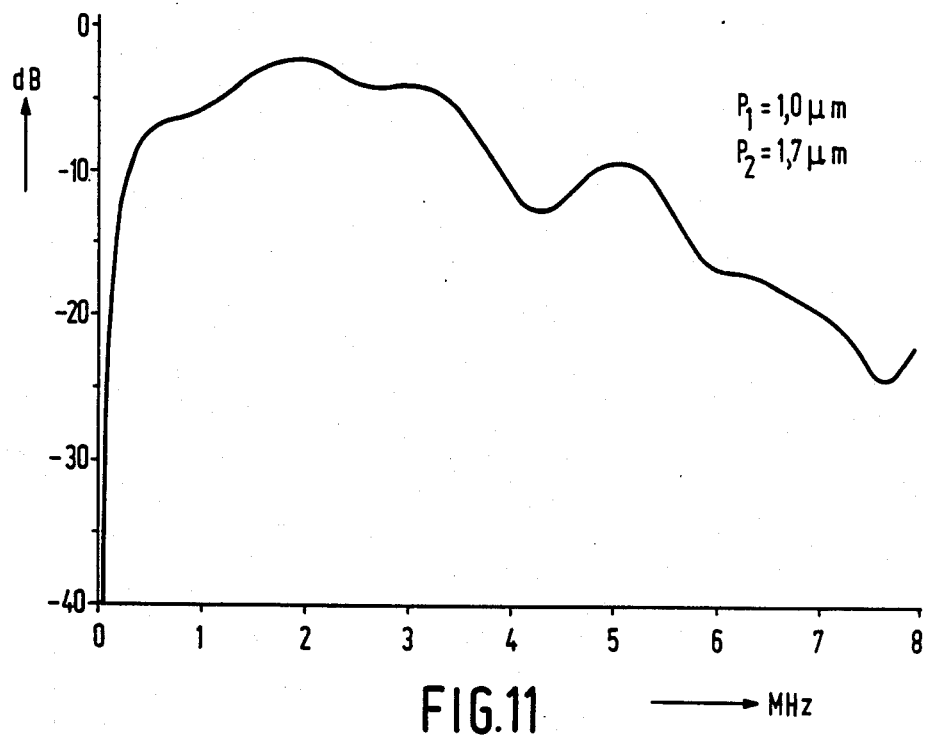

In FIG. 10, at $P_2 = 1.6$ μm and $P_1 = $μm and FIG. 11, at $P_2 = 1.7$ μm and $P_1 = 1.0$ μm the frequency characteristic at higher freqeuncies is irregular but the lower frequencies are readily compensated.

It appears from FIGS. 3—11 that at the given values of $G_1$, $G_2$, G and $P_1$ the ratio $P_2/P_1$ should preferably be between 1.15 and 1.35. However, besides the frequency range to be reproduced, this ratio also depends slightly on $G_1$, $G_2$, G and $P_1$ and will have to be optimized for each design of magnetic head.

If the freqeuncy range to be reproduced only extended up to 3.5 MHz, only the first two dips need to be compensated. The optimum ratio $P_2/P_1$ is then between 1.5 and 2.0 as may be seen from FIGS. 10 and 11. The part of the frequency characteristic which is straight is shifted to lower frequencies when the ratio $P_2/P_1$ becomes larger, as is evident in FIGS. 3—11. The optimum ration $P_2/P_1$ also proves to become larger when the layer thickness $P_1$ becomes smaller because the peaks and valleys then become spaced apart by a proportionally larger frequency range. This means that at smaller layer thicknesses and at a reproduced frequency range which is invariably 1-8 MHz, only the first dip(s) need be compensated. The optimum ratio $P_2/P_1$ therefore is between 1.15 and 2.

Finally it is to be noted that experiments have demonstrated that the thickest layer can best be provided on that side of the gap where the tap leaves the gap.

What is claimed is:

1. A magnetic head including a core of a soft-magnetic material with a comparatively low saturation magnetization, for writing signals on a magnetic medium during relative motion between the medium and said head in a given direction, said core having two gap-bounding faces extending transversely to said direction, each of said gap-bounding faces being coated with a respective layer of soft-magnetic material having a higher saturation magnetization than the material of the core, said layers defining a gap therebetween, said gap having a given thickness in said direction, and the head further having two respective transition zones which are poor magnetic conductors formed between the gap bounding faces and the respective layers of soft-magnetic material, said zones having a thickness in said direction substantially less than said given thickness, said zones being formed by intermediate layers of non-magnetic material which are applied to said gap bounding faces of the core to bond the respective layers of soft-magnetic material to the material of the core, said layers of soft-magnetic material having thicknesses, in said given direction, which differ in a ratio of at least 1.15 to 1, the exact ratio being determined by the desired frequency characteristic of the head.

2. A head as claimed in claim 1, characterized in that the ratio of the thicknesses of said layers of soft-magnetic material is between 1.15 and 2.

3. A head as claimed in claim 2, characterized in that said ratio is approximately 1.25.

4. A head as claimed in claim 1, characterized in that said transition zones are formed by intermediate layers of non-magnetic material which are applied to said gap bounding faces of the core to bond the respective layers of soft-magnetic material to the material of the core.

5. A head as claimed in claim 4 wherein the transition zones are of at least approximately equal thickness.

6. A head as claimed in claim 1, wherein the thickest layer of soft magnetic material is provided on that side of the gap where the tape leaves the gap.

7. A head as claimed in claim 6, wherein the transition zones are of at least approximately equal thickness.

* * * * *